United States Patent [19]

Jameson et al.

[11] 4,034,058

[45] July 5, 1977

[54] METHOD FOR PRODUCING SYNTHETIC SODIUM ALUMINOSILICATE ION-EXCHANGE MATERIAL FROM CALCINED KAOLIN CLAY

[75] Inventors: M. Phillip Jameson; Fred R. Huege, both of Somerville, N.J.

[73] Assignee: Engelhard Minerals & Chemicals Corporation, Edison, N.J.

[22] Filed: June 29, 1976

[21] Appl. No.: 700,862

[52] U.S. Cl. .............................. 423/118; 252/89 R; 252/455 Z; 423/328

[51] Int. Cl.² .................................... C01B 33/28

[58] Field of Search .......... 423/118, 328, 329, 330; 252/455 Z

[56] References Cited

UNITED STATES PATENTS

| | | |
|---|---|---|
| 3,112,176 | 11/1963 | Haden et al. .................. 423/118 |
| 3,114,603 | 12/1963 | Howell ............................. 423/118 |
| 3,119,660 | 1/1964 | Howell et al. .................... 423/118 |
| 3,236,606 | 2/1966 | Moore et al. .................... 106/72 X |
| 3,733,391 | 5/1973 | Hoffman ........................... 423/118 |
| 3,816,093 | 6/1974 | Hildreth ............................. 75/1 |

Primary Examiner—Edward J. Meros
Attorney, Agent, or Firm—Inez L. Moselle

[57] ABSTRACT

Kaolin clay is dehydrated at a temperature in excess of about 600° C. and below 980° C. and the dehydrated clay is chlorinated in a gas-solid reaction at elevated temperature to remove colored iron impurities as volatile chlorides. The dehydrated clay is then cooled and reacted with an aqueous solution of sodium hydroxide, optionally containing additional sources of alumina and silica, to produce high purity hydrated sodium aluminosilicates such as sodium zeolite A in the form of white crystals.

6 Claims, No Drawings

METHOD FOR PRODUCING SYNTHETIC SODIUM ALUMINOSILICATE ION-EXCHANGE MATERIAL FROM CALCINED KAOLIN CLAY

BACKGROUND OF THE INVENTION

This invention is directed to the synthesis of hydrated alkali metal silicate ion-exchange material in the form of white crystals using discolored iron-contaminated naturally occurring kaolin clay as a source of alumina and silica.

There is currently interest in using certain sodium aluminosilicate ion-exchange materials in detergent compositions. Reference is made to Belgian Pat. No. 814,874 to Corkell et al. The preferred sodium aluminosilicate ion-exchange material has the formula $Na_{12}(AlO_2.SiO_2)_{12}.27H_2O$ which corresponds to the formula of sodium zeolite A as described in U.S. Pat. No. 2,882,243 to Milton. The ion-exchange builder material may be produced, according to the Belgian patent, from high purity sodium aluminate, sodium silicate, sodium hydroxide and water. It is well known that zeolitic aluminosilicates such as sodium zeolite A can be obtained at relatively low cost by using minerals as sources of silica and/or alumina. Kaolin clay calcined to the so-called "metakolin" state or condition is an example and it is useful when reacted with sodium hydroxide solution as the source of both silica and alumina in the production of zeolite A. Obviously a sodium aluminosilicate product used as a builder in a washing composition intended for consumer use must have a white, bright appearance in order to satisfy aesthetic demands.

PRIOR ART

The following patents describe methods for producing finely divided crystals of the hydrated sodium aluminosilicate such as those known as zeolites A and X from calcined kaolin clay and sodium hydroxide solution.

U.S. Pat. No. 3,185,544 to Philip K. Maher
U.S. Pat. No. 3,114,603 to Peter A. Howell.

Methods for removing iron impurities from calcined kaolin clay by high temperature chlorination are known in the art and are described in several patents of which the following are exemplary:

U.S. Pat. No. 3,236,606 to Jackson C. Moore et al
U.S. Pat. No. 3,816,093 to Clarence L. Hildreth.

Russian Pat. No. 199,127 to N. L. Eremin describes a method for producing a calcined clay product of improved color and impurity. The kaolin is calcined at 900° to 1000° C., chlorinated with chlorine and hydrogen chloride in a fluidized bed at 600° to 700° C. and the calcined clay is leached with a solution of caustic soda. Titania and iron are removed along with silica.

To the best of our knowledge, it has not been possible prior to our invention to produce white crystals of zeolitic alkali metal aluminosilicates from calcined clay even when the original clay, prior to calcination, had been extensively purified by means such as flotation or magnetic separation to remove discrete colored impurities and has undergone extensive conventional chemical bleach treatment to remove iron impurities. For example, we attempted to produce crystals of sodium zeolite A using as a reactant a material produced by calcining commercial high brightness paper coating grades of kaolin clay. These coating clays had been produced by subjecting impure kaolin clay to froth flotation to remove discrete colored impurities and after flotation iron stain was removed from the clay by a conventional dithionite bleach treatment. The coating clays had brightness values of about 90 percent (as determined by the well-known TAPPI procedure). However, after they had been calcined to reactive (metakaolin) condition and reacted with sodium hydroxide solution, the fine crystals of sodium zeolite A that were produced had a brightness of only 70 percent. Moreover, it was found that the brightness of the starting clay could not be used to predict the brightness of the crystalline sodium aluminosilicate reaction product. Thus, we succeeded in producing crystals that had a brightness of 80 percent from starting clays having a brightness below 90 percent. However, crystals having a desired brightness of 90 percent or above could not be obtained from any of the commercially available kaolin clays we tested.

An object of this invention is to increase the brightness of crystals of zeolitic metalloaluminosilicates obtained using calcined clay as a reactant.

THE INVENTION

The instant invention results from an hypothesis which would explain why the brightness of synthetic crystalline metalloaluminosilicates obtained by reaction of caustic solutions with calcined kaolin clay cannot be predicted from the brightness of the original clay. In accordance with this hypothesis, small amounts of iron colored impurties in the clay matrix or otherwise occluded in the structure of the clay mineral have a minimal effect on the brightness of the clay but when the clay is calcined and then used as a reactant in the synthesis of a zeolitic aluminosilicate, the iron becomes finely disseminated throughout the crystalline reaction product and has a discoloring effect that is materially more pronounced than when such impurities were originally occluded in the structure of the clay particles. Based on this hypothesis and the discovery that iron impurities in clay that cannot be removed by conventional methods is especially amenable to removal by volatilization as a chloride when the clay is calcined to so-called "metakolin" state or condition, a novel method for producing high purity synthetic metalloaluminosilicates from calcined kaolin clay has been invented.

The essence of the invention resides in chlorinating calcined (dehydrated) kaolin clay in a gas-solid reaction at elevated temperature to volatilize iron impurities before the calcined clay is used as a reactant with a source of alkali metal oxide and optional additional sources of silica and/or alumina, both the calcination and the chlorination being carried out at a temperature in the range of 600° to 980° C., whereby the clay is in the state or condition of metakaolin after both calcination and chlorination.

An essential feature of the invention resides in chlorinating the kaolin clay after the clay has been calcined at a temperature (below 980° C.) and time such that the dehydrated clay is in the form of metakolin but before the metakaolin is reacted with caustic to synthesize the zeolite crystals. Volatilization of iron from the zeolite crystals would destroy the crystals if in fact efficient removal could be effected. Iron cannot be volatilized to an appreciable extent from uncalcined kaolin clay by known means. Still another essential feature resides in controlling the temperature of the clay during calcination and chloridization as described above in order to secure both efficient removal of iron by volatilization while providing the calcined clay a state or condition such that it is reactive with caustic to produce the desired synthetic crystalline sodium aluminosilicate.

In a preferred embodiment of the invention the chlorinated calcined clay is used as the sole source of silica and alumina and zeolite A is crystallized. In other embodiments zeolite A is crystallized using the chlorinated calcined clay as the major source of both silica and alumina, synthetic sources of silica and/or alumina, such as sodium silicate and sodium aluminate being used along with the calcined clay. In still other embodiments ion-exchange zeolites such as zeolites X or Y which have higher $SiO_2/Al_2O_3$ molar ratios than zeolite A are prepared by reacting chlorinated calcined clay with an additional source of silica and/or alumina.

The term "metakaolin" as used herein is described in U.S. Pat. No. 3,338,672 to Walter L. Haden, Jr. et al.

All brightness values refer to those obtained with an ELREPHO meter using TAPPI standard method T-646 m-54. Reflectance to light at 457 millimicrons is used in making brightness measurements.

DETAILED DESCRIPTION

The starting clay, which may be a soft or hard kaolin clay crude, should be refined at least to the extent that gross impurities are removed. Superficial iron stain may be removed by chemical bleach using, for example, a dithionite salt at an acidic pH. Acid grades of bleached clay may be preferred when synthesizing finely metalloaluminates as a finely divided precipitate; for example, particles in the range of ½ to 15 microns. These grades are obtained by dewatering acid flocculated clay pulps such as the pulps produced during conventional dithionite (hydrosulfite) bleaching of kaolin clay to remove superficial iron stain. These pulps can be dewatered by filtration, producing acidic filter cakes which are washed, dried and pulverized. Alternatively the washed filter cakes can be dispersed in water to form slurries which are dried in spray dryers. When using spray dried grades of kaolin clay, it may be necessary to avoid the use of conventional clay dispersants such a sodium silicate, sodium hydroxide or sodium condensed phosphates since these materials may cause undesirable fluxing during calcination and/or chloridization. Ammonium hydroxide is a recommended dispersant for the production of spray dried kaolin clay used as a starting material for the synthesis of finely divided crystals of zeolitic aluminosilicate. When a product having premium brightness is desired, discrete titania mineral particles and/or those of iron should also be removed from the clay before the clay is calcined.

Known means such as froth flotation, selective flocculation, magnetic separation or combinations of such processing steps may be employed to remove discrete impurities (such as colored titaniferous and iron impurities) associated with kaolin clay. Normally such beneficiation is carried out while the clay is in the form of a neutral or alkaline slurry or suspension. After beneficiation the clay may be acidified, bleached and dewatered. It is within the scope of the invention, however, to use unbleached clay which has not undergone such beneficiation.

The iron content of a typical bleached, beneficiated soft kaolin clay (expressed as $Fe_2O_3$) is generally in the range of about 0.2 percent to 0.3 percent based on the weight of the clay after being calcined to anhydrous condition at 980° C. So-called "gray" kaolins usually analyze 0.7 to 0.9 percent by weight $Fe_2O_3$ after beneficiation and bleaching.

The purified starting clay is composed predominantly of a mineral of the kaolin family; for example, kaolinite, halloysite, nacrite or dickite. These are hydrated crystalline aluminosilicates of the approximate empirical formula $Al_2O_3.2SiO_2.2H_2O$ (except for certain halloysites which contain more water). As mentioned, the clay must be calcined to a substantially anhydrous condition before metal impurities are volatilized as a chloride and this calcination must be carried out at a temperature below 980° C. in order to assure that the calcined clay is in metakaolin condition. This reaction is strongly endothermic. Preferred calcination temperatures are in the range of about 650° to 800° C. with time varying with the equipment used. At temperatures about 800° C. there is a possibility of local overheating which could impair the reactivity of the calcined clay. Rotary calciners are useful, as are fluidized bed calciners. It is necessary to remove the off-gases containing water volatilized from the clay during calcination before the clay is chloridized since water evolved during chlorination will interfere with the formation of metal chlorides in subsequent processing.

It is not necessary to cool the clay discharged from the calciner before it is treated at elevated temperature with a gas capable of reacting with impurities, especially iron in the clay. For economic reasons it is preferable not to cool the clay between calcination and chloridization. Suitable chloridizing agents known in the art include chlorine, hydrochloric acid and carbon tetrachloride. A carbonaceous material such as carbon monoxide or carbon may be introduced during chlorination in known manner to accelerate the formation of iron chlorides. Means are provided for venting the off-gases which include metal chlorides formed during chloridization. Chloridization can be carried out in static bed, rotary or fluidized bed furnaces equipped with means to minimize leakage of noxious gases and for removing off-gases. The furnace should be lined with corrosion-resistant material. Preferably chloridization is carried out at a temperature above 600° C.; for example, 750° C., in order to achieve sufficiently rapid reaction. An upper limit of chloridization temperature is about 980° C. since local overheating may occur at higher temperature. Preferably, the $Fe_2O_3$ analysis of the chloridized clay is below 0.1 percent by weight.

After chloridization is complete, residual chloridizing agent may be swept from the treated clay by passing air or nitrogen through the clay. The treated clay is cooled to at least a temperature below about 100° C. before it is used as a reactant to form the zeolite crystals.

When the calcined clay is employed to produce zeolite A it must be in metakaolin condition and thus the temperature of the clay during chlorination must be in the range of about 600° to 980° C. Reaction conditions such as described in U.S. Pat. No. 3,114,603 (supra) may be used to synthesize sodium zeolite A. When synthetic faujasite (such as zeolite X) is to be produced, additional sources of alumina and silica must be employed with the metakaolin, as is known in the art. Reference is made to U.S. Pat. No. 3,185,544. For example, the metakaolin may be reacted with sodium hydroxide solution and sodium silicate to produce crystals of zeolite X.

After crystallization of the desired sodium aluminosilicate is completed, the crystals should be washed free of alkali and they can be dried mildly, for example at a temperature of about 100° C.

The following example of the production of high brightness crystals of sodium zeolite A from kaolin clay is given for illustrative purposes and is not to be considered as limiting the invention to the particular reaction conditions and processing equipment used.

The starting clay was a pulverized acid grade of high purity hydrated kaolin clay. The hydrated clay was a commercial product (ASP 170) having a brightness of 90 percent and containing 90 percent by weight of particles finer than 2 microns (equivalent spherical diameter). The clay was produced by "Ultraflotation" (as described in U.S. Pat. No. 2,990,958 to Greene et al) to remove discrete colored titania and iron impurities. After flotation the clay was bleached in an acidic pulp with a dithionite bleach reagent. Iron content ($Fe_2O_3$ was 0.33 percent (anhydrous weight basis).

A vertical tube furnace was loaded with a charge of 1800 g. of the hydrated clay. The furnace was turned on and the bed was fluidized with nitrogen during the preheat period (about 1½ hours). The temperature of the clay charge was controlled at about 800° C. to assure formation of metakaolin. When the charge was at temperature, chlorine gas (90 percent $N_2$ and 10 percent $Cl_2$) was introduced at a rate of 100 cc./min. for a total chlorination period of 8 hours. The chlorine treated clay analyzed 0.05 percent $Fe_2O_3$ and had a brightness of 96.8 percent. Acid-soluble $Al_2O_3$ content was 44.8 percent, indicating the calcined clay was in metakaolin condition.

The chlorine treated calcined clay (140 g.) was added to 1260 g. of sodium hydroxide solution (10 percent weight) and heated to 180° F. while being agitated. The molar ratio of the reactants was as follows: 1¼ $Na_2O$ : 1.0 $Al_2O_3.2SiO_2$: 40 $H_2O$. The reaction time (crystallizing time) was 5 hours at 180° F. Samples were taken at hourly intervals to determine zeolite formation as determined by X-ray diffraction.

After 5 hours of crystallizing time, the sample was filtered and washed with deionized water. The sample was dried overnight at 160° F.

Product analysis was as follows:

| | |
|---|---|
| Brightness, % | 95.2 |
| Average particle size, microns (as determined by sedimentation) | 3.1 |
| $H_2O$, % (determined at 800° C.) | 18.30 |
| Free alkalinity, % | 0.02 |
| pH | 10.3 |
| Calcium exchange capacity* | 330 |

*calcium exchange capacity is reported as mg $CaCO_3$/gm. product (anhydrous)

We claim:

1. In a process for producing crystals of an ion-enchange crystalline alkali metal aluminosilicate wherein calcined kaolin clay is reacted with a source of alkali metal oxide and opitionally additional sources of silica and alumina, the improvement which comprised chlorinating kaolin clay previously calcined to metakaolin condition in a gas-solid reaction at a temperature in the range of 600° to 980° to volatilize iron impurities in the clay before using said calcined clay as a reactant to produce said alkali metal aluminosilicate.

2. In a process for producing finely divided particles of a synthetic crystalline sodium aluminosilicate zeolite by heating an aqueous alkaline reaction mixture consisting essentially of oxides of aluminum, silicon and sodium, the major portion of said aluminum and silicon oxides being provided by the inclusion in the reaction mixture of finely divided particles of metakaolin until finely divided zeolite crystals form, separating the zeolite crystals from the reaction liquid and washing the crystals, which process results in a zeolite product having a brightness substantially less than the brightness of the clay used to produce said metakaolin reactant, the improvement whereby the zeolite product will have a substantially higher brightness, which comprises removing iron-bearing impurities from the metakaolin by volatilizing the impurities with a chlorine-bearing gas at a temperature in the range of 600° to 980° C. before including the metakaolin in the aqueous alkaline reaction mixture used to produce the zeolite.

3. In a process for producing finely divided crystals of sodium zeolite A which comprises forming an aqueous reaction mixture consisting essentially of oxides of aluminum, silicon and sodium, the major portion of said aluminum and silicon oxides being provided by the inclusion in the reaction mixture of finely divided particles of metakaolin obtained by calcining naturally-occurring kaolin clay, heating the reaction mixture until sodium zeolite A crystals form, and recovering sodium zeolite A as the product, the improvement which comprises heating said metakaolin in an atmosphere of chlorine-bearing gas at a temperature in the range of 750° to 850° C. for a time sufficient to volatilize iron-bearing impurities in the metakaolin, removing the volatilized iron-bearing impurities from the metakaolin, and cooling the metakaolin thus treated before incorporating the metakaolin in the reaction mixture and crystallizing sodium zeolite A therefrom, whereby the sodium zeolite A product will have a higher brightness, when measured by the TAPPI procedure, than the product would have in the absence of the treatment of said metakaolin in the atmosphere of a chlorine-bearing gas.

4. The method of claim 3 wherein the metakaolin reactant is obtained by removing discrete colored titania and iron-bearing impurities from naturally-occurring hydrated kaolin clay by flotation and bleacing the flotation beneficiated clay with a dithionite bleach in aqueous acidic media before calcining the hydrated clay to produce metakaolin whereby the treatment of the metakaolin with chlorine-bearing gas removes iron-bearing impurities not removed from the hydrated clay by flotation and bleaching.

5. The method of claim 3 wherein metakaolin is the sole source of oxides of aluminum and silicon in the reaction mixture and sodium hydroxide is the sole source of sodium oxide.

6. The method of claim 3 wherein the reaction mixture is formed by slurrying metakaolin in sodium hydroxie solution of about 10 percent concentration.

* * * * *